(12) United States Patent
Buettner et al.

(10) Patent No.: US 9,045,017 B2
(45) Date of Patent: Jun. 2, 2015

(54) METHOD FOR CHASSIS CONTROL OF A MOTOR VEHICLE, AND DEVICE FOR THE PERFORMANCE THEREOF

(75) Inventors: Silke Buettner, Ludwigsburg (DE); Ivica Durdevic, Pliezhausen (DE); Ralph Boeker, Ludwigsburg (DE); Roman Sankin, Abstatt-Happenbach (DE); Alexander Habenicht, Stuttgart (DE); Michael Knoop, Ludwigsburg (DE); Oliver Wagner, Allmersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 730 days.

(21) Appl. No.: 13/138,273

(22) PCT Filed: Dec. 28, 2009

(86) PCT No.: PCT/EP2009/067965
§ 371 (c)(1),
(2), (4) Date: Nov. 4, 2011

(87) PCT Pub. No.: WO2010/089007
PCT Pub. Date: Aug. 12, 2010

(65) Prior Publication Data
US 2012/0055745 A1 Mar. 8, 2012

(30) Foreign Application Priority Data

Feb. 3, 2009 (DE) .......................... 10 2009 000 572
Jul. 22, 2009 (DE) .......................... 10 2009 027 939

(51) Int. Cl.
*B60G 17/0165* (2006.01)
*B60G 17/016* (2006.01)
(Continued)

(52) U.S. Cl.
CPC ........ *B60G 17/0161* (2013.01); *B60G 17/0162* (2013.01); *B60G 17/018* (2013.01);
(Continued)

(58) Field of Classification Search
USPC ............. 188/266.1, 266.2, 266.5, 282.1, 313;
303/196; 701/37, 38; 280/5.506, 5.507, 280/5.512, 5.513
See application file for complete search history.

(56) References Cited

U.S. PATENT DOCUMENTS 4,691,284 A * 9/1987 Izumi et al. ..................... 701/38
4,865,148 A * 9/1989 Marumoto et al. ........... 180/446
(Continued)

FOREIGN PATENT DOCUMENTS

CN 1636776 7/2005
DE 39 17 716 12/1989
(Continued)

*Primary Examiner* — Thomas J Williams
*Assistant Examiner* — Mariano Sy
(74) *Attorney, Agent, or Firm* — Kenyon & Kenyon LLP

(57) ABSTRACT

In a method for chassis control of a motor vehicle which has at least one wheel suspension, a vehicle body, and a shock absorber having a rebound stage, whose stiffness is adjustable, and a compression stage, whose stiffness is adjustable, the stiffness of the compression stage is changed for a compressive load of the shock absorber generated by a specific vehicle body movement, and the stiffness of the rebound stage is additionally changed for a subsequently following tensile load of the shock absorber generated by the specific vehicle body movement, or the stiffness of the rebound stage is changed for a tensile load of the shock absorber generated by a specific vehicle body movement, and the stiffness of the compression stage is additionally changed for a subsequently following compressive load of the shock absorber generated by the specific vehicle body movement.

20 Claims, 10 Drawing Sheets

(51) Int. Cl.
*B60G 17/018* (2006.01)
*B60G 17/08* (2006.01)

(52) U.S. Cl.
CPC ....... *B60G 17/08* (2013.01); *B60G 2400/0521* (2013.01); *B60G 2400/0522* (2013.01); *B60G 2400/102* (2013.01); *B60G 2400/204* (2013.01); *B60G 2400/252* (2013.01); *B60G 2400/39* (2013.01); *B60G 2400/41* (2013.01); *B60G 2400/5182* (2013.01); *B60G 2500/10* (2013.01); *B60G 2600/184* (2013.01); *B60G 2600/187* (2013.01); *B60G 2600/604* (2013.01); *B60G 2800/012* (2013.01); *B60G 2800/014* (2013.01); *B60G 2800/164* (2013.01); *B60G 2800/22* (2013.01)

(56) References Cited

U.S. PATENT DOCUMENTS

| | | | |
|---|---|---|---|
| 4,948,163 A | | 8/1990 | Kikushima et al. |
| 4,975,849 A | * | 12/1990 | Ema .............................. 701/37 |
| 5,159,555 A | * | 10/1992 | Wada ............................. 701/40 |
| 5,205,581 A | * | 4/1993 | Kallenbach et al. ... 280/124.161 |
| 5,322,318 A | * | 6/1994 | Kimura et al. ............... 280/5.51 |
| 5,324,067 A | | 6/1994 | Kallenbach et al. |
| 5,670,872 A | * | 9/1997 | Van De Walle et al. ...... 324/171 |
| 5,802,486 A | * | 9/1998 | Uchiyama ....................... 701/37 |
| 6,092,011 A | * | 7/2000 | Hiramoto ......................... 701/37 |
| 6,321,887 B1 | * | 11/2001 | Kurusu et al. ............. 188/266.2 |
| 7,055,832 B2 | * | 6/2006 | Germain ..................... 280/5.508 |
| 7,699,147 B2 | * | 4/2010 | Preukschat et al. .......... 188/282.4 |
| 2001/0035317 A1 | * | 11/2001 | Sakai et al. ................. 188/266.2 |
| 2002/0133277 A1 | | 9/2002 | Koh |
| 2004/0039506 A1 | * | 2/2004 | Kim ................................ 701/37 |
| 2005/0113998 A1 | | 5/2005 | Kim |
| 2006/0042895 A1 | * | 3/2006 | Mangelschots et al. . 188/322.19 |

FOREIGN PATENT DOCUMENTS

| | | |
|---|---|---|
| DE | 41 12 004 | 10/1992 |
| DE | 198 15 859 | 10/1998 |
| EP | 0 591 754 | 4/1994 |
| EP | 1 391 332 | 2/2004 |
| GB | 2 265 201 | 9/1993 |
| JP | 62-29410 | 2/1987 |
| JP | 2-74411 | 3/1990 |
| JP | 5-38920 | 2/1993 |
| JP | 7-149132 | 6/1995 |
| JP | 8-2231 | 1/1996 |
| JP | 8-104121 | 4/1996 |
| JP | 2004-75066 | 3/2004 |

* cited by examiner

METHOD FOR CHASSIS CONTROL OF A MOTOR VEHICLE, AND DEVICE FOR THE PERFORMANCE THEREOF

BACKGROUND OF THE INVENTION

1. Field of the Invention

The present invention relates to a device and a method for chassis control of a motor vehicle, which has at least one wheel suspension, which carries a vehicle body, having a shock absorber.

2. Description of Related Art

Methods for chassis control of a motor vehicle are known from the related art. For example, a method for activating a shock absorber, which is adjustable in its damping characteristic, of a motor vehicle is known from published German patent application document DE 41 120 04 C2. For this purpose, the shock absorber has an adjustable valve for adjusting the damping characteristic, the changeovers between the damping characteristics to be performed to optimize the properties of the motor vehicle being a function of whether the shock absorber is loaded by compression or tension. The stiffness of the shock absorber, i.e., the damping ratio, is set in such a way that the movement of the vehicle body is damped.

BRIEF SUMMARY OF THE INVENTION

According to the present invention, at least one wheel suspension, which carries a vehicle body, is provided with a shock absorber, which has a rebound stage, whose stiffness is adjustable and a compression stage, whose stiffness is adjustable, the stiffness of the compression stage being changed, in particular increased, for a compressive load generated by a specific vehicle body movement, and the stiffness of the rebound stage additionally being changed, in particular increased, for a subsequently following tensile load generated by the specific vehicle body movement, or the stiffness of the rebound stage being changed, in particular increased, for a tensile load generated by a specific vehicle body movement and the stiffness of the compression stage additionally being changed, in particular increased, for a subsequently following compressive load generated by the specific vehicle body movement. A shock absorber is therefore provided which is designed having two stages and whose different stages, the compression stage and the rebound stage, are adjusted independently of one another in their stiffness or in their damping ratio. The compression stage and the rebound stage are adjusted in their stiffness as a function of the specific vehicle body movement, initially only one of the stages being adjusted in a first phase of the vehicle body movement and subsequently the second stage being adjusted in its stiffness during a subsequent phase of the vehicle body movement. The shock absorber may thus operate optimally during the particular vehicle body movement phase (compressive load or tensile load). In particular the vehicle body return movement following the vehicle body movement may be damped independently. The specific vehicle body movement may be a vehicle body movement caused due to a brake application and/or by cornering in particular.

The shock absorber advantageously has at least one first valve for adjusting the stiffness of the compression stage and at least one second valve for adjusting the stiffness of the rebound stage, the first valve being switched to change, in particular increase, the stiffness of the compression stage before a compressive load of the shock absorber which is generated by the specific vehicle body movement, and additionally the second valve being switched to change, in particular increase, the stiffness of the rebound stage during the subsequently occurring compressive load, or the second valve being switched to change, in particular increase, the stiffness of the rebound stage before a tensile load of the shock absorber which is generated by the specific vehicle body movement, and the first valve being switched to change, in particular increase, the stiffness of the compression stage during the subsequently occurring tensile load. In such a shock absorber, the adjustment of the shock-absorber stiffness or the damping ratio is always performed in the particular powerless idle stroke. Therefore, the positioning command or the switching of the valve associated with the corresponding stage only achieves its effect when the valve is switched in the unloaded state. In the present case, the first valve is used for adjusting the stiffness of the compression stage and the second valve is used for adjusting the stiffness of the rebound stage of the shock absorber. Prior to an expected compressive load of the shock absorber which is generated by the specific vehicle body movement, according to the present invention, the first valve is switched to increase the stiffness of the compression stage and then, when the compressive load due to the vehicle body movement actually occurs, the second valve is switched to increase the stiffness of the rebound stage. The change between the compressive load and the tensile load of the shock absorber occurs regularly when a vehicle body return movement is also expected after a vehicle body movement. By switching the first valve even before the compressive load of the shock absorber has occurred and additionally switching the second valve during the occurring compressive load of the shock absorber to increase the particular damping ratio, the shock absorber may operate optimally during the compressive load and during the tensile load. In particular the vehicle body return movement may be damped independently of the vehicle body movement. Correspondingly, according to the present invention, the second valve is switched to increase the stiffness of the rebound stage before a tensile load of the shock absorber generated by an expected vehicle body movement and the first valve is switched to increase the stiffness of the compression stage during the occurring tensile load. Whether the shock absorber is compression- or tensile-loaded during the vehicle body movement is essentially a function of the type of excitation and the configuration of the shock absorber or the configuration of the wheel suspension having it on the motor vehicle.

A global movement of the vehicle body and/or a local movement of the shock absorber is advantageously taken into consideration during the switching of the first and/or the second valves to set the stiffness of the shock absorber. The local movements of the shock absorbers are essentially movements excited by roadway roughness. Such movements typically occur at high deflection frequency. In contrast, the global movement of the shock absorber is caused above all by driving interventions of the driver of the motor vehicle and the vehicle body movements connected thereto. They are essentially characterized by a lower deflection frequency in comparison to the local movement. However, reciprocal effects also exist. Thus, roadway roughness may also excite global vehicle body movements, and driving interventions of the driver may result in local movements of the shock absorber. In the advantageous method, the local movements of the shock absorber and/or the global vehicle body movements of the motor vehicle are thus preferably determined or ascertained and the stiffness of the shock absorber is set or controlled and/or regulated on this foundation. The shock absorber advantageously has electronics associated therewith for this purpose, having a separate microcontroller and a connection to a common data bus, so that a separate central control unit may be dispensed with and instead an existing control unit of the chassis area (for example, the ESP control unit or a central control unit of the chassis domain) may be used, and external auxiliary sensors, for example, vertical acceleration sensors or spring deflection sensors, may be dispensed with. The local movement of the shock absorber is advantageously analyzed using an analysis unit associated with the shock absorber. The analysis is performed directly on the shock absorber or in the analysis unit associated with the shock absorber. In this way, a change in the local movement may be reacted to very rapidly, whereby the quality of the control and/or regulation of the shock absorber is increased. The analysis unit may be associated with the shock absorber or even integrated therein. The global movement is advantageously estimated in an existing control unit of the motor vehicle. The global movement, which is caused by driver inputs, such as braking or steering, must be estimated, since otherwise control and/or regulation of the shock absorber on the basis of measured movement data of the vehicle body would always trail the actual requests. Recognition using body movement sensors and reaction time due to signal transmission and processing would be too slow for this purpose. Variables such as roll angle, roll rate, and/or roll acceleration, pitch angle, pitch rate, and/or pitch acceleration of the vehicle body may be determined when estimating the global movement. The estimation is performed predictively, so that the specific vehicle body movement to be expected is determined.

A global movement to be expected is advantageously estimated as a function of steering wheel angle, brake pedal position, gas pedal position, setpoint acceleration, setpoint torque, and/or at least one actual state variable of the motor vehicle. The listed variables are variables which are caused directly by the driver and are easily detectable. In particular, the steering wheel angle, the pressure in the master brake cylinder, requests for a brake actuation by driver assistance systems (for example, adaptive cruise control (ACC)), the requested engine torque (setpoint torque), and the presence of a gear change are analyzed. The signals are typically already provided in a vehicle stabilization system, for example, the above-mentioned ESP. The setpoint acceleration may relate to both a longitudinal acceleration and also a transverse acceleration of the vehicle and may also be detected and/or determined by a driver assistance system. The determination of the yaw rate is also advantageous and may be performed from the steering angle, for example.

According to one refinement of the present invention, a braking or acceleration action which triggers a global vehicle body movement is determined or estimated as a function of the brake pedal position and/or the gas pedal position. A negative setpoint acceleration results from the brake pedal position and a positive setpoint acceleration of the motor vehicle results from the gas pedal position, the negative setpoint acceleration (=deceleration) also being able to be determined via the brake pressure. A pitching movement of the vehicle body around a transverse axis is produced by the brake application. Using the above-described method it is possible to damp the vehicle body movement accordingly during a brake application. When braking starts, i.e., as soon as a braking intent is recognized by the brake pedal position, the first valve of shock absorbers on the front axle (compression stage) and the second valve of shock absorbers on the rear axle (rebound stage) are switched to increase the stiffness or the damping ratio. The pitching movement of the vehicle body forward during the occurring brake application is thus damped. If the brake application is executed until the vehicle is at a standstill, the vehicle body subsequently pitches to the rear, after the vehicle has come to a standstill. Therefore, during a brake application, shortly before the motor vehicle is at a standstill, the first valve of the shock absorbers on the rear axle (compression stage) and the second valve of the shock absorbers on the front axle (rebound stage) of the motor vehicle are advantageously switched to increase the stiffness, while the rebound stage of the shock absorbers on the rear axle is switched with the aid of the particular second valve and the compression stage of the shock absorbers on the front axle is switched with the aid of the particular first valve into their respective normal state. The expected vehicle body movement is the pitching of the vehicle body to the rear in this case when the vehicle has come to a standstill. As already described above, the first and the second valves are then advantageously switched in such a way that the damping ratio of the compression stage of the shock absorber on the rear axle and the damping ratio of the rebound stage on the front axle are increased. According to the above-described advantageous method for chassis control, upon reaching a standstill, i.e., during the pitching movement of the vehicle body to the rear, the second valve of the shock absorbers on the rear axle and the first valve of the shock absorbers on the front axle of the motor vehicle are additionally switched to increase the stiffness. In other words, the damping ratio of the rebound stage of the shock absorbers on the rear axle and the damping ratio of the compression stage of the shock absorbers on the front axle are additionally increased for the vehicle body return movement, which follows the pitching to the rear. Therefore, when the vehicle body pitches back to the front after the already damped pitching to the rear, the pitching back also occurs in a damped way. Advantageously, overall, a) the stiffness of the compression stages on the front axle and the stiffness of the rebound stages on the rear axle are therefore increased with braking start, b) the stiffness of the rebound stages on the front axle and the compression stages on the rear axle are increased shortly before the vehicle is at a standstill, c) the remaining compression and rebound stages are increased in their stiffness while the vehicle body pitches to the rear after reaching a standstill, and d) after the pitching movement subsides, all compression stages and rebound stages of the shock absorbers are switched into their normal position (normal damping ratio). The compression stages on the front axle and the rebound stages on the rear axle are advantageously switched into their normal state during b). The initial pitching moment of the vehicle body after the deceleration to a standstill is thus counteracted and the pitching oscillations thus generated are damped. For this purpose, in particular the brake pressure and longitudinal velocity of the motor vehicle are observed, only the ESP sensors being able to be used for this purpose. A counter torque is generated due to the adjustment of the individual shock absorber stages (rebound or compression stage). Since the counter torque may not be actively built up because of the constructive design of the shock absorber, the counter torque only acts as a reaction torque. The setting of the particular stage (rebound or compression stage) must be performed prior to the relative movement between wheel and vehicle body, since the valves may not be switched during the movement. As described above, the compression and rebound stages of the opposing axles are predictively set stiffer.

According to one refinement of the present invention, cornering which triggers a global movement is estimated or determined as a function of the steering wheel angle. The vehicle body experiences a global excitation as soon as the driver performs a lateral course change through the control intervention on the steering wheel by adjusting the steering wheel angle. This excitation results in a gyration of the vehicle body around the vehicle longitudinal axis (vehicle roll) as a result of its inertia.

Upon initiation of cornering by changing the steering wheel angle, the first valve of at least one shock absorber on the outside of the curve and the second valve of at least one shock absorber on the inside of the curve are advantageously switched to increase the stiffness. In this case, a vehicle-side-dependent activation of the shock absorbers therefore occurs, while in contrast an axle-dependent activation is performed during the brake application. During the occurring cornering, i.e., when a rolling movement of the vehicle body occurs, the second valve of the at least one shock absorber on the outside of the curve and the first valve of the at least one shock absorber on the inside of the curve are switched to increase the stiffness. In other words, upon initiation of cornering, a compressive load of the shock absorber on the outside of the curve is expected and the first valve is therefore switched to increase the stiffness of the compression stage, while the stiffness of the rebound stage of the shock absorber on the inside of the curve, where the shock absorber experiences a tensile load, is switched to increase the stiffness. Before the vehicle body swings back or the vehicle body return movement occurs, the remaining stages of the shock absorbers are also switched to increase the stiffness. The rolling movement of the vehicle body during cornering is thus minimized and the driving comfort is increased.

According to one advantageous refinement of the present invention, the first valve and/or the second valve is/are only switched to increase the stiffness upon exceeding a determinable threshold value with respect to the load of the shock absorber. This prevents the rebound stage and/or the compression stage of the shock absorber from also already being adjusted in its damping ratio in the event of only small deflections. In particular, this prevents small local deflections or movements of the shock absorber, which are rather negligible for the entire vehicle body, from always resulting in an adjustment of the stiffness.

Advantageously, the first valve and/or the second valve is/are switched to reduce the stiffness if the threshold value is not reached over a certain period of time. The shock absorber or shock absorbers are thus reset to their original setting again.

One refinement of the present invention provides that the local movement is determined on the basis of at least one shock-absorber pressure. Therefore, means are provided on the shock absorber to determine at least one shock-absorber pressure. The shock-absorber pressure may be analyzed in the analysis unit associated with the shock absorber, for example, to determine the local movement. A (relative) change in the shock-absorber pressure may also be analyzed.

One refinement of the present invention provides that the local movement is a vertical movement at a fastening point of the shock absorber. The fastening point of the shock absorber specifies the position at which the shock absorber is fastened on the motor vehicle, in particular the body of the motor vehicle. Only the vertical velocity is observed. All other velocity components are dispensed with or are incorporated into the vertical velocity.

One refinement of the present invention provides that the local movement is calculated from a shock-absorber force and/or a pressure difference, in particular in consideration of a characteristic curve of the shock absorber. Therefore, the shock-absorber force and/or the pressure difference is/are initially determined. This may be performed, for example, via the determination of multiple pressures of the shock absorber, it being advantageous to determine the pressure in the compression stage and the pressure in the rebound stage of the shock absorber. The local movement, described by a shock-absorber velocity—i.e., the relative velocity between a shock-absorber piston and a shock-absorber tube—may be determined with the aid of inversion of the shock-absorber characteristic curve from the shock-absorber force or from the differential pressure, a characteristic curve which is associated with the instantaneous valve position being used. A combination of the listed calculation approaches is also possible.

One refinement of the present invention provides that the shock-absorber force and/or the pressure difference is/are determined from a pressure in an upper chamber of the shock absorber and a pressure in a lower chamber of the shock absorber. Therefore, means are provided to determine the shock-absorber pressure in both the rebound stage and also the compression stage. The pressure in the upper chamber corresponds to the pressure of the rebound stage and the pressure in the lower chamber corresponds to the pressure of the compression stage.

One refinement of the present invention provides that the shock absorber is a single-tube shock absorber and in particular its shock-absorber deflection is estimated. In single-tube shock absorbers, the shock-absorber deflection may also be estimated independently of the shock-absorber force and the shock-absorber velocity. For this purpose, the mean pressure is analyzed, which rises with increasing spring deflection because of the penetration of the piston rod into the shock absorber. The volume compensation occurs in single-tube shock absorbers via a gas volume, which is decreased by the volume of the penetrating piston rod.

One refinement of the present invention provides that the local movement is analyzed for high-frequency components and/or the global movement is analyzed for low-frequency components. The high-frequency components are, for example, frequencies in the range of the wheel natural frequency, i.e., for example, 10 Hz to 15 Hz, while the low-frequency components are frequencies in the range of the natural frequency of the body of the motor vehicle. The latter are in the range of 1 Hz to 2 Hz, for example. At least one filter may be provided for this purpose, which only allows the high-frequency components for the local movement and/or only allows the low-frequency components for the global movement to pass.

One refinement of the present invention provides that a shock-absorber stiffness for the compression stage and for the rebound stage are determined in each case from the local movement and the global movement. The shock-absorber stiffness is determined separately for the global movement and the local movement. For this purpose, various analysis pathways are provided. One analysis pathway is used for the local movement and a further one is used for the global movement. In each case a shock-absorber stiffness for the compression stage and for the rebound stage results from the two analysis pathways.

One refinement of the present invention provides that the shock-absorber stiffness from the local movement and the shock-absorber stiffness from the global movement are combined to form a total shock-absorber stiffness. After the determination of the shock-absorber stiffness for both the local movement and also the global movement, they are thus combined to form the total shock-absorber stiffness. The shock-absorber stiffness and/or the total shock-absorber stiffness for the rebound stage and the compression stage are advantageously handled separately. The shock-absorber stiffness is typically a value in the range from 0 to 1, 0 standing for very soft and 1 standing for very stiff.

One refinement of the present invention provides that the shock absorber is set according to the total shock-absorber stiffness. The shock absorber is thus controlled and/or regulated in such a way that it behaves according to the determined total shock-absorber stiffness. Therefore, it is not set solely according to the shock-absorber stiffness for the local movement or the shock-absorber stiffness for the global movement, but rather according to the combination of the two values.

The device according to the present invention is distinguished by at least one wheel suspension, which carries a vehicle body, having a shock absorber, which has a rebound stage, which is adjustable in the stiffness, and a compression stage, which is adjustable in the stiffness, the stiffness of the compression stage being changed, in particular increased, for a compressive load of the shock absorber generated by a specific vehicle body movement, and the stiffness of the rebound stage additionally being changed, in particular being increased, for a subsequently following tensile load of the shock absorber generated by the specific vehicle body movement, or the stiffness of the rebound stage being changed, in particular increased, for a tensile load of the shock absorber generated by a specific vehicle body movement, and the stiffness of the compression stage additionally being changed, in particular being increased, for a subsequently following compressive load of the shock absorber generated by the specific vehicle body movement.

The shock absorber advantageously has at least one first valve for adjusting the stiffness of the compression stage and at least one second valve for adjusting the stiffness of the rebound stage, the first valve being switched to change, in particular increase the stiffness of the compression stage before a compressive load of the shock absorber generated by the specific vehicle body movement, and the second valve additionally being switched to change, in particular increase, the stiffness of the rebound stage during the occurring compressive load, or the second valve being switched to change, in particular increase, the stiffness of the rebound stage before a tensile load of the shock absorber generated by a specific vehicle body movement, and the first valve being switched to change, in particular increase, the stiffness of the compression stage during the occurring tensile load.

One refinement of the present invention provides that the shock absorber has an analysis unit and/or at least one pressure measuring unit and/or an output stage of at least one valve of the shock absorber is settable with the aid of the analysis unit. The analysis unit, the pressure measuring unit—i.e., means for measuring the pressure—and the valve, together with the output stage associated therewith, are associated with the shock absorber and/or integrated therein.

One refinement of the present invention provides that the analysis unit is connected to an existing control unit of the motor vehicle, which estimates the global movement, via a data bus. The control unit is an already provided control unit of the motor vehicle, for example, the ESP control unit or the central control unit of the chassis domain. The global movement is estimated with the aid of this control unit, i.e., a separate control unit is not provided for the device for chassis control. The analysis unit of the shock absorber is connected to this control unit via a data bus, so that data may be exchanged between them. These data include, for example, the shock-absorber stiffness and the total shock-absorber stiffness and/or values for the local movement of the shock absorber and/or the global movement of the motor vehicle.

DETAILED DESCRIPTION OF THE INVENTION

Figure 1:
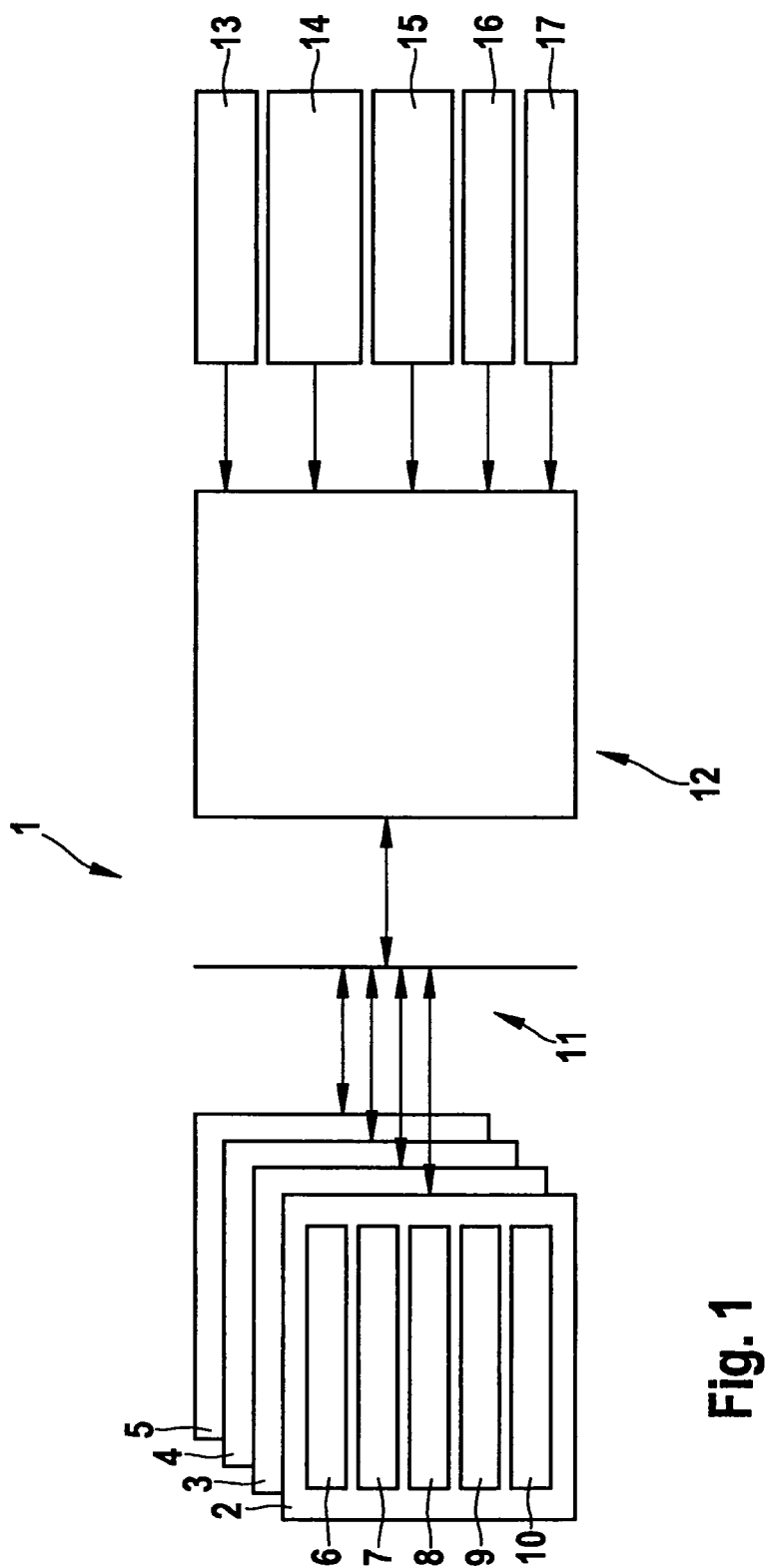
FIG. 1 shows a schematic view of a device and a method for chassis control of a motor vehicle.

FIG. 1 shows a system structure 1, as may be used in the method according to the present invention and/or the device according to the present invention, for example. Four shock absorbers 2, 3, 4, and 5 are provided, each shock absorber being associated with one wheel of a motor vehicle (not shown). Shock absorbers 2, 3, 4, and 5 are provided between the wheel and a body of the motor vehicle, i.e., they are a component of a wheel suspension (also not shown). Each adjustable shock absorber has pressure sensors 6, a microprocessor 7, two output stages 8, with the aid of which a valve drive 9 may be activated in each case, and, via the valve drive, a valve 10. Each of pressure sensors 6, output stages 8, valve drives 9, and valves 10 are associated with one rebound stage and one compression stage of shock absorber 2 in each case. Therefore, one of pressure sensors 6 is used for the purpose of determining the pressure in the compression stage, while the other of pressure sensors 6 is used to determine the pressure in the rebound stage. The stiffness of the compression stage and/or the rebound stage of shock absorber 2 may be set in each case with the aid of output stage 8, valve drive 9, and valve 10.

Output stages 8 are activated by microprocessor 7, which both analyzes signals of pressure sensors 6, and is also connected via a data bus 11 to an existing control unit 12 of the motor vehicle and exchanges data therewith. Control unit 12 is an ESP control unit, for example. Control unit 12 additionally receives data from a steering angle sensor 13, a sensor for determining the yaw rate and/or the transverse acceleration, and/or a pressure sensor 15 for determining the pressure in a brake cylinder (not shown).

Furthermore, the control unit receives data from an engine controller 16 and a transmission controller 17. Engine controller 16 may deliver the requested engine torque and/or a current speed of a drive unit of the motor vehicle, for example. Transmission controller 17 informs control unit 12, for example, which gear is engaged and whether a gear change is currently being performed.

With the aid of control unit 12, the global movement or the vehicle body movement is determined and a shock-absorber stiffness is determined from the global movement. Microprocessor 7 of shock absorber 2, 3, 4, or 5 determines the local movement, in particular from the data of pressure sensors 6, and also calculates a shock-absorber stiffness therefrom. The shock-absorber stiffness from the global movement is transmitted from control unit 12 via data bus 11 to microprocessor 7. The microprocessor determines a total shock-absorber stiffness from the shock-absorber stiffness for the local movement and the shock-absorber stiffness for the global movement. This total shock-absorber stiffness is subsequently set with the aid of output stage 8, valve drive 9, and valve 10 on shock absorber 2, 3, 4, or 5. The shock-absorber stiffness or the total shock-absorber stiffness is determined in each case for the rebound stage and the compression stage of shock absorber 2, 3, 4, or 5. Pressure sensors 6, microprocessor 7, output stages 8, valve drives 9, and valves 10 of each shock absorber 2, 3, 4, 5 are associated with particular shock absorber 2, 3, 4, or 5, i.e., are local shock absorber devices. In contrast, control unit 12 is provided for analyzing the global movement of the motor vehicle and is therefore a central component. The global movement may therefore also be referred to as a central movement. Shock absorber 2 is provided on the left front of the motor vehicle, shock absorber 3 on the right front, shock absorber 4 on the left rear, and shock absorber 5 on the right rear.

Figure 2:
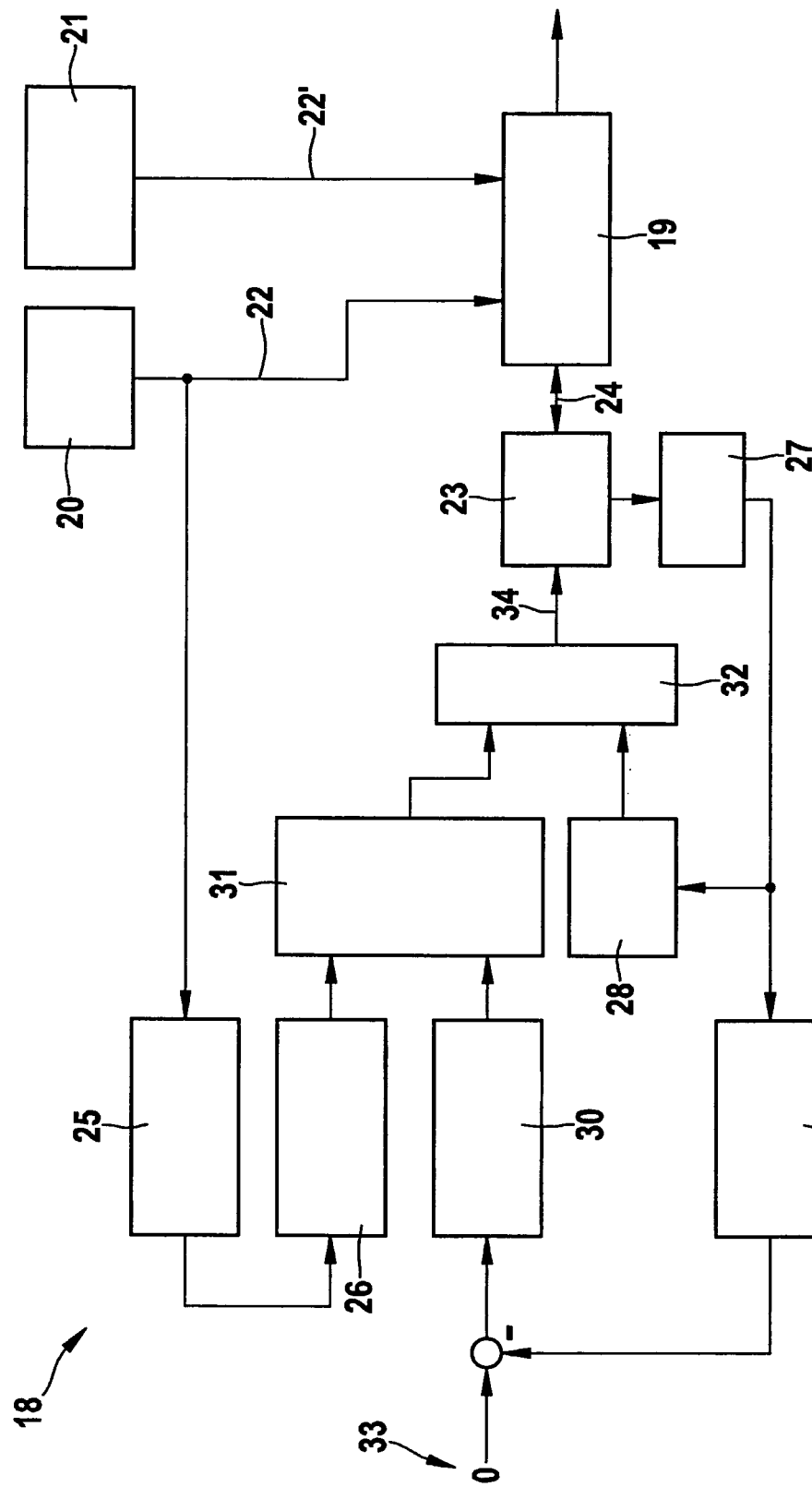
FIG. 2 shows a functional structure of the device and the method.

FIG. 2 shows a functional structure 18, as may be provided in the method according to the present invention or the device according to the present invention. The motor vehicle, or its wheels and body, are symbolized by box 19. Various influencing factors act on the motor vehicle, for example, the driver—symbolized by box 20—and the roadway—symbolized by box 21. The particular influences are identified by arrows 22 and 22'. The wheels and the body of the motor vehicle interact with shock absorbers 2, 3, 4, and 5, which are shown by box 23, the interaction being symbolized by arrow 24. Box 20 therefore symbolizes the influences which are induced by the driver of the motor vehicle, while box 21 describes the roadway influences. In a first function block 25, the influence of the driver (box 20) is used for the purpose of estimating the global movement or the vehicle body movement. This is performed on the basis of the data which are available to control unit 12 from steering angle sensor 13, sensor 14, pressure sensor 15, engine controller 16, and/or transmission controller 17.

The predictive estimation is required since effective damping of the global movement may only be performed during the movement itself. Recognition using movement sensors associated with the body would be too slow because of reaction times due to signal transmission and processing. First function block 25 provides variables of the global movement, for example, roll angle, roll rate, roll acceleration, and/or pitch angle, pitch rate, pitch acceleration, and/or yaw angle, yaw rate, yaw acceleration. The variables estimated in first function block 25 are relayed to second function block 26. The requirements for the setting of the shock absorber for the compression stage and the rebound stage of four shock absorbers 2, 3, 4, and 5 are determined in this function block from the estimated variables. For example, in the case of a predicted rolling movement to the right, the compression stage of shock absorbers 3 and 5 on the right side of the motor vehicle and the rebound stage of shock absorbers 2 and 4 on the left side of the motor vehicle are stiffened. In the case of prediction of the backswing of the rolling movement (return movement), the other shock absorber settings are additionally stiffened. In the case of a predicted pitching movement to the front, the compression stage of shock absorbers 2 and 3 on the front of the motor vehicle and the rebound stage of shock absorbers 4 and 5 on the rear of the motor vehicle are stiffened. First function block 25 and second function block 26 are integrated into control unit 12, which is presumed to be provided, of the vehicle stabilization system (for example, ESP) or in an existing central control unit of the chassis domain. The shock-absorber stiffness from the global movement is therefore provided in each case for the compression stage and the rebound stage of shock absorbers 2, 3, 4, and 5.

In a third function block 27, a movement of shock absorbers 2, 3, 4, and 5 and a force acting on shock absorbers 2, 3, 4, and 5 are determined. This is performed from the pressures which were determined with the aid of pressure sensors 6. A pressure $\rho_{top}$ is associated with the compression stage and a pressure $\rho_{bottom}$ is associated with the rebound stage. The shock-absorber movement is described, for example, by the variables shock-absorber velocity and/or shock-absorber deflection (spring deflection). Prior to processing the pressures determined with the aid of pressure sensors 6, they are initially prepared, i.e., possibly corrected by an offset and/or filtered, in order to suppress measuring noise. In addition, monitoring of the pressures may be used, for example, in order to exclude incorrectly determined pressures from the subsequent analysis. Shock-absorber force $F_{shock}$ may be determined on the basis of the equation $$F_{shock} = A_{top} \cdot \rho_{top} - A_{bottom} \cdot \rho_{bottom}$$

$A_{top}$ and $A_{bottom}$ being the top and bottom cross-sectional areas of a shock-absorber piston of shock absorber 2.

Shock-absorber velocity $v_D$, i.e., a relative velocity between the shock-absorber piston and a shock-absorber tube of shock absorber 2, 3, 4, and 5 may be determined using two different approaches. Shock-absorber force $F_D$ may initially be determined with the aid of inversion of shock-absorber characteristic curve $F_D = f_1 (v_D,$ position of valve 10), which is associated with the instantaneous valve position. Subsequently, shock-absorber velocity $v_D$ is calculated using the equation $$v_D = f_1^{-1} (F_D, \text{position of valve 10}).$$

The calculation of shock-absorber velocity $v_D$ from a differential pressure $\Delta\rho = \rho_{top} - \rho_{bottom}$ with the aid of a characteristic curve, which is associated with the instantaneous position of valve 10, may also be provided. This is performed on the basis of the equation $$v_D = f_2 (\Delta\rho, \text{position of valve 10}).$$

These two calculation approaches may be used individually or in combination. In case of a combination, an arbitration logic decides which value or mean value is used. If shock absorbers 2, 3, 4, 5 are single-tube shock absorbers, shock-absorber deflection $z_{shock}$ may be estimated independently of shock-absorber force and shock-absorber velocity. For this purpose, mean pressure $(\rho_{bottom} + \rho_{top})/2$ is analyzed, which rises because of the penetration of the piston rod into shock absorber 2, 3, 4, 5 with increasing spring deflection. The volume compensation is performed in single-tube shock absorbers via a gas volume which is reduced by the volume of the penetrating piston rod. This is explained hereafter on the basis of FIG. 3. Vertical velocity $v_{shock}$ at the body-side fastening point of shock absorbers 2, 3, 4, and 5 is estimated from the shock-absorber velocity with the aid of a suitable estimation algorithm. For example, a Kalman filter suggests itself as an estimation method here. An overview of the function of third function block 27 is provided hereafter on the basis of FIG. 4.

The shock-absorber movement variables and/or the shock-absorber force which are estimated from the pressure signals are processed further in a fourth function block 28 and a fifth function block 29. A roadway-dependent determination of the shock-absorber stiffness is performed in fourth function block 28 on the basis of the shock-absorber movement variables and/or the shock-absorber force. This means that the shock-absorber stiffness is determined from the local movement. Shock-absorber-external variables are not used in this determination. The regular goals are reducing the wheel load oscillations and improving the comfort in the frequency range of the wheel natural vibrations, which are in the range of approximately 10 Hz to 15 Hz. For example, a frequency-selective activation comes into consideration as an algorithm. This is described hereafter on the basis of FIG. 5.

In fifth function block 29, information about the movement mode of the vehicle body, i.e., about the lifting, rolling, and pitching movements, is determined from the shock-absorber-local information, which third function block 27 provides. Suitable descriptive variables for the movement of the vehicle body are, for example, lift velocity $v_z$ in the center of gravity of the body, roll rate $dt_{phi}$, and pitch rate $dt_{theta}$. The aggregation is performed, for example, according to the equations $$v_z=(v_{FL}+v_{FR}+v_{RL}+v_{RR})/4$$

$$dt_{phi}=(-v_{FL}+v_{FR}-v_{RL}+v_{RR})/(2\cdot b)$$

$$dt_{theta}=(-v_{FL}-v_{FR}+v_{RL}+v_{RR})/(2\cdot L)$$

In this case, $v_{shock}$ refers to the vertical velocity on the body-side fastening point of particular shock absorber 2, 3, 4, and 5, b refers to the track width, and L refers to the wheelbase. FL stands for the front left shock absorber, FR right front, RL left rear, and RR right rear.

These estimated variables of the body movement are used in a sixth function block 30, to perform control of the movement of the body. Sixth function block 30 has setpoint values 33 of the body movement (typically equal to 0) and the estimated variables of the body movement originating from fifth function block 29, for example, $v_z$, $dt_{phi}$, and $dt_{theta}$, as input variables. From these input variables, sixth function block 30 determines a shock-absorber stiffness, separated in each case according to rebound stage and compression stage. Similarly to second function block 26, sixth function block 30 thus determines the shock-absorber stiffness which is necessary to damp the global movement of the motor vehicle.

Finally, a seventh function block 31 is used for the purpose of combining the shock-absorber stiffness which was determined in second function block 26 and sixth function block 30 into one shock-absorber stiffness. This combination is performed separately in each case for the rebound stage and compression stage of shock absorbers 2, 3, 4, and 5. Examples of arbitration approaches for performing such merging are, for example, $$\text{Rebound}=\max\{\text{rebound}_{local},\text{rebound}_{global}\}$$

$$\text{compression}=\max\{\text{compression}_{local},\text{compression}_{global}\}$$

$$\text{rebound}=\text{rebound}_{local}+\text{rebound}_{global}-\text{rebound}_{local}\cdot\text{rebound}_{global}$$

$$\text{compression}=\text{compression}_{local}+\text{compression}_{global}-\text{compression}_{local}\cdot\text{compression}_{global}$$

Rebound and compression refer in each case to the positioning requests for the stiffness of the shock absorber or the damping ratio. This is specified in a value range from 0 to 1. A shock-absorber stiffness, which may be used for damping the global movement, is now provided in seventh function block 31. This shock-absorber stiffness from seventh function block 31 is conveyed, like the shock-absorber stiffness from fourth function block 28, into an eighth function block 32. Therefore, this eighth function block 32 has the shock-absorber stiffness which was determined from the local movement and the shock-absorber stiffness which was determined from the global movement as input variables. In eighth function block 32, they are combined to form a total shock-absorber stiffness. This is performed similarly to seventh function block 31 or using the same arbitration approaches. Shock absorbers 2, 3, 4, and 5 are set with the aid of the total shock-absorber stiffness determined in eighth function block 32, as symbolized by arrow 34.

Fifth function block 29, sixth function block 30, and seventh function block 31 are executed in control unit 12, which is associated, for example, with a vehicle stabilization system provided in any case (for example, ESP). The integration of listed function blocks 29, 30, 31 into an existing central control unit of the chassis domain also optionally suggests itself. If this central control unit has an expanded inertial sensor system having measurement of lift acceleration $a_z$, roll rate $dt_{phi}$, and pitch rate $dt_{theta}$, fifth function block 29, which performs the calculation of the body movement variables, may be omitted.

Third function block 27, fourth function block 28, and eighth function block 32 may be executed in microprocessor 7 of shock absorbers 2, 3, 4, and 5.

Figure 3:
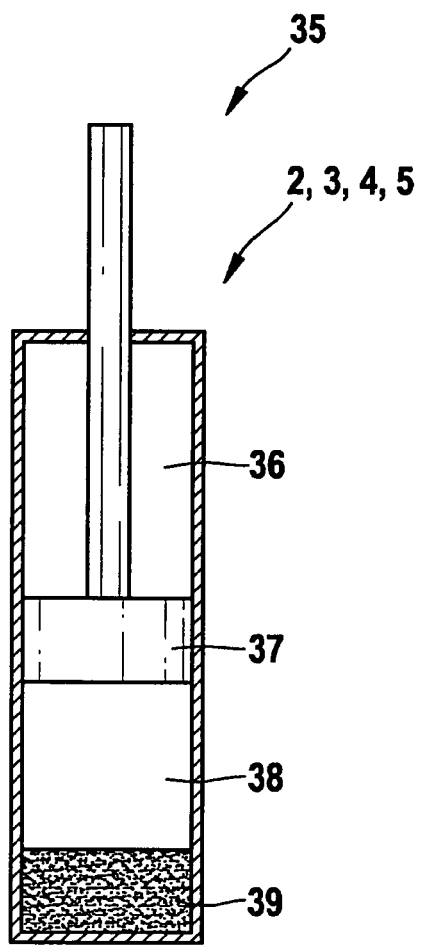
FIG. 3 shows a single-tube shock absorber, as may be used together with the method and/or the device of the present invention.

FIG. 3 shows a single-tube shock absorber 35, which may be used as shock absorbers 2, 3, 4, and 5, for example. Means (not shown) are provided on single-tube shock absorber 35 to determine pressure $\rho_{top}$ and pressure $\rho_{bottom}$. Pressure $\rho_{top}$ is provided in a chamber 36 above a piston rod 37, while pressure $\rho_{bottom}$ is provided in a chamber 38. A gas volume 39 located in single-tube shock absorber 35 is also shown in FIG. 3.

Figure 4:
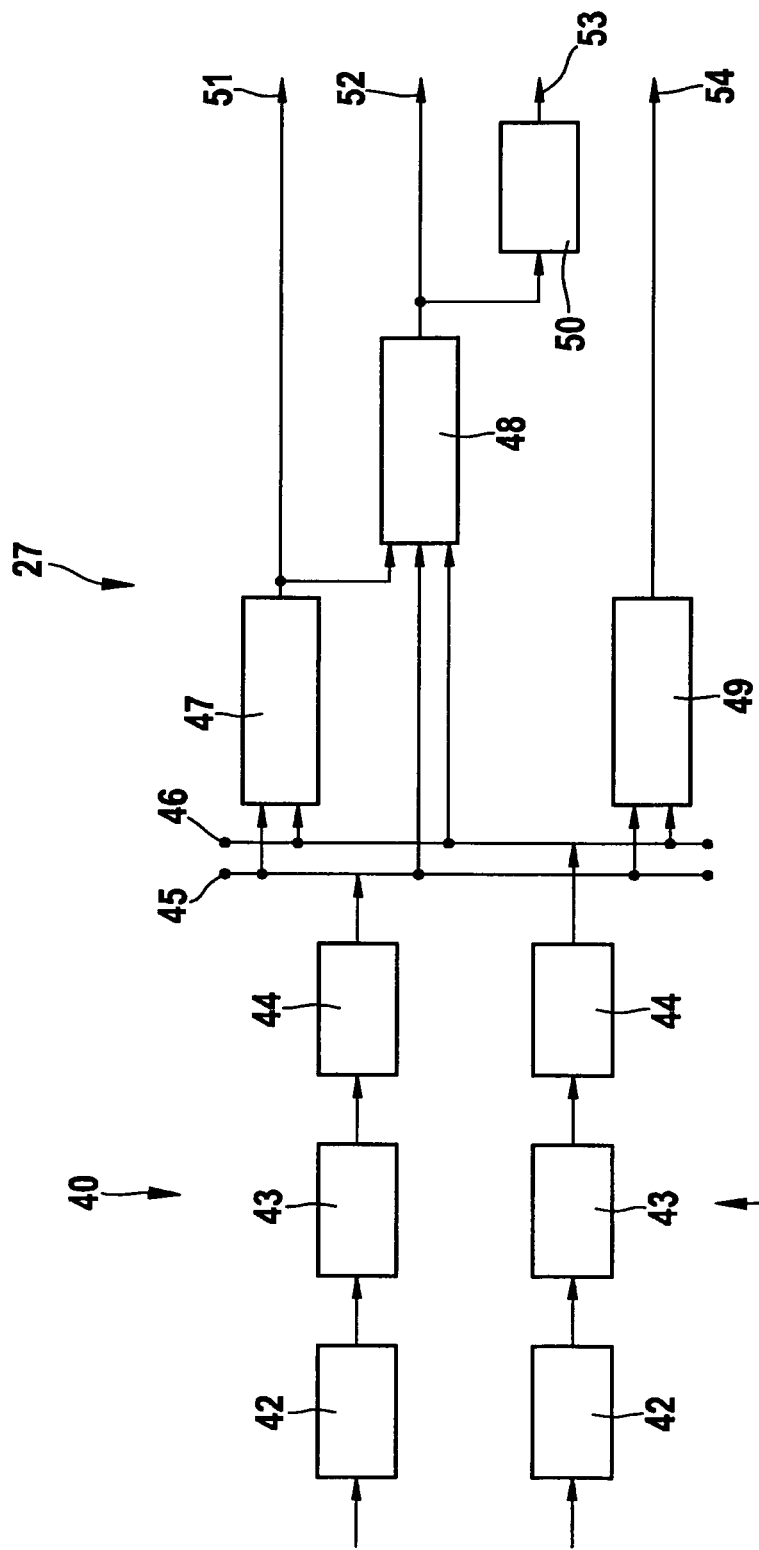
FIG. 4 shows a flow chart for a block of the functional structure shown in FIG. 2.

FIG. 4 shows a structure of third function block 27. It is clear that it has two calculation strands 40 and 41, calculation strand 40 having pressure $\rho_{top}$ as an input variable and calculation strand 41 having pressure $\rho_{bottom}$ as an input variable. In both calculation strands 40 and 41, an offset correction is first performed (box 42), a low-pass filter is subsequently applied (box 43), and finally a plausibility check is performed (box 44). Subsequent to box 44, the result of calculation strand 40 is output into a first channel 45 and the result of calculation strand 41 is output into a second channel 46. A filtered pressure signal for pressure $\rho_{top}$ and $\rho_{bottom}$ is thus provided in first channel 45 and second channel 46. Both pressure signals $\rho_{top}$ and $\rho_{bottom}$ are used as the input variable in each case for function block 47, 48, and 49. An estimation of the shock-absorber force is performed in function block 47 using the pressures, which is then supplied to function block 48 as an input variable, like pressures $\rho_{top}$ and $\rho_{bottom}$. An estimation of the shock-absorber velocity is performed from these three variables in function block 48.

Function block 49 is used to estimate the shock-absorber deflection. However, this may only be performed if a single-tube shock absorber 35 is provided as shock absorber 2, 3, 4, or 5. Subsequent to function block 48, a further function block 50 is provided, in which the vertical movement at the fastening point of shock absorber 2, 3, 4, or 5 is estimated from the shock-absorber velocity. Accordingly, the shock-absorber force is applied to an output 51, the shock-absorber velocity is applied to an output 52, the vertical movement at the fastening point of shock absorber 2, 3, 4, or 5 is applied to an output 53, and the shock-absorber deflection is applied to an output 54. The variables applied to outputs 51, 52, 53, and 54 may subsequently be used as input variables of fourth function block 28 and fifth function block 29.

Figure 5:
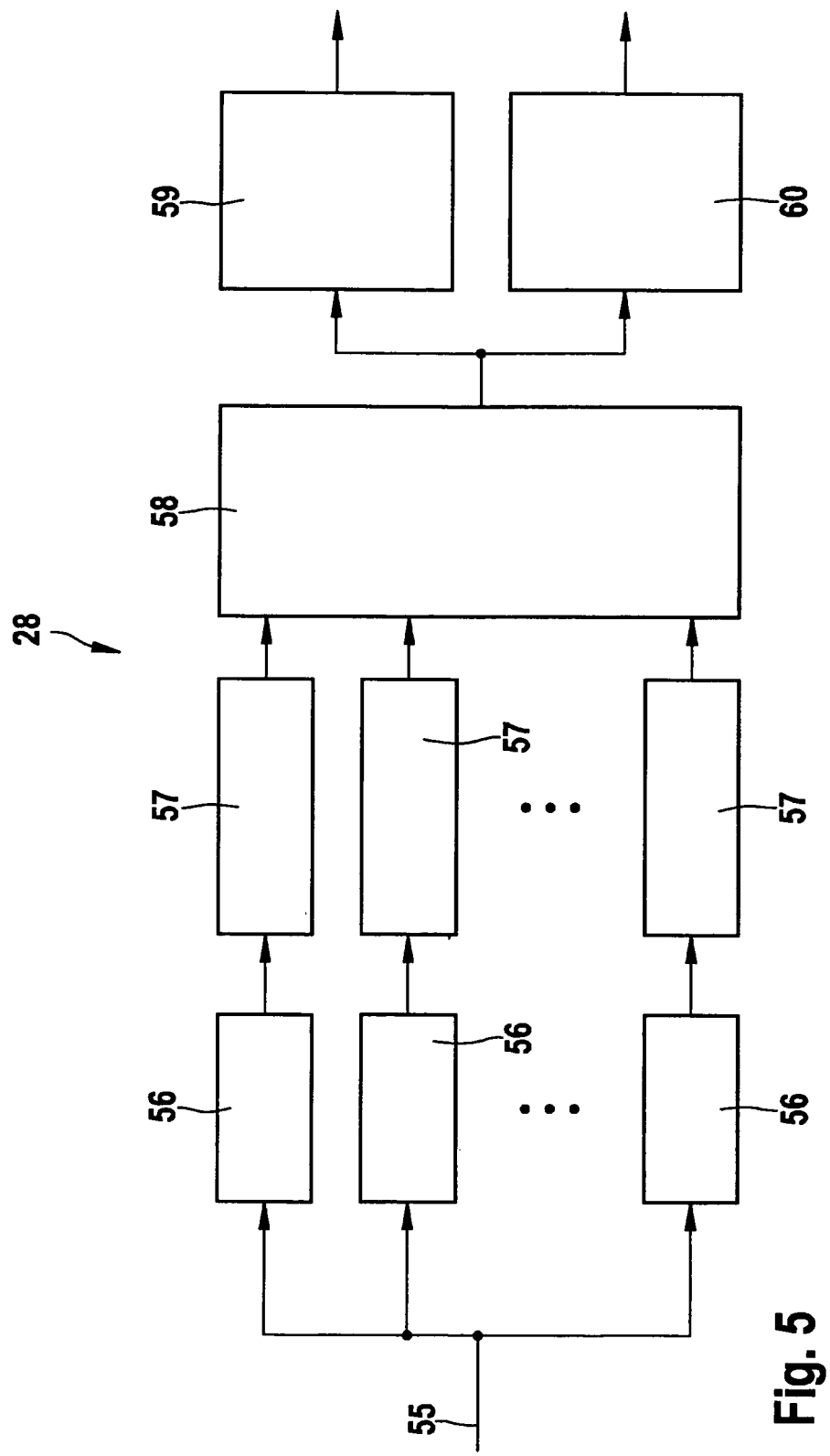
FIG. 5 shows a flow chart for a further block of the functional structure.

FIG. 5 shows an example of a construction of fourth function block 28. It determines the shock-absorber stiffness from the local movement of shock absorber 2, 3, 4, or 5. As described above, the output variables of third function block 27 are used as the input variable. They are applied to an input 55. A frequency-selective activation is used as an algorithm in fourth function block 28. For this purpose, the shock-absorber movement variable is initially evaluated via one or more filters (box 56). The filters may be band-pass filters, for example. Subsequently, an amplitude calculation is performed (box 57). If the determined amplitudes in the relevant frequency range i.e., at the output of the filter (box 56), exceed defined limiting values, a greater stiffness of shock absorber 2, 3, 4, or 5 is requested. The output variables of the amplitude calculation are weighted (box 58) and a characteristic curve for the rebound stage (box 59) and the compression stage (box 60) of shock absorbers 2, 3, 4, and 5 is determined from the result of this weighting.

Figure 6A:
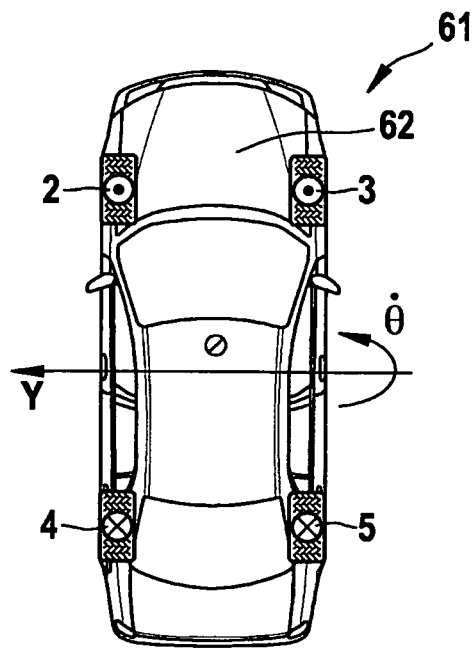
FIG. 6A and FIG. 6B show a schematic exemplary embodiment of the advantageous method in the case of a pitching movement.
Figure 6B:
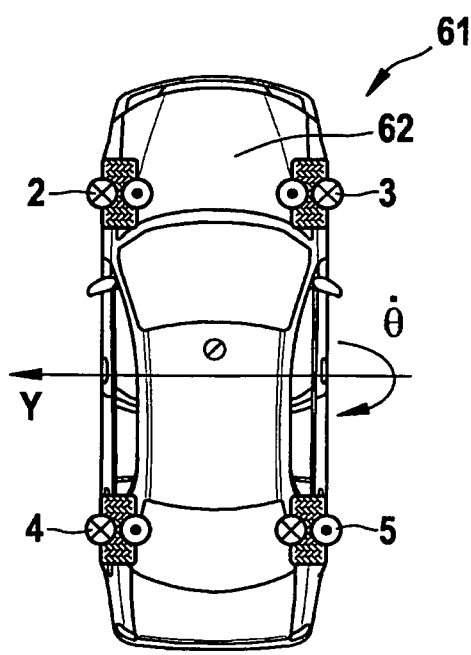

FIGS. 6A and 6B show a motor vehicle 61 having shock absorbers 2, 3, 4, and 5 in the exemplary embodiment. Each of shock absorbers 2, 3, 4, 5 has a first valve for adjusting the stiffness of the compression stage and a second valve for adjusting the stiffness of the rebound stage. Prior to a compressive load of shock absorbers 2-5 generated by an expected vehicle body movement of vehicle body 62 of motor vehicle 61, the particular first valve is switched to increase the stiffness of the compression stage and, during the occurring compressive load, the second valve is additionally switched to increase the stiffness of the rebound stage. Prior to a tensile load of shock absorbers 2-5 generated by an expected vehicle body movement, the (particular) second valve is correspondingly switched to increase the stiffness of the rebound stage and, during the occurring tensile load, the first valve is switched to increase the stiffness of the compression stage. In the case shown in FIGS. 6A and 6B, a brake application occurs, in which a pitching movement of the motor vehicle occurs as described above, motor vehicle 61 pitching around a transverse axis Y. During the brake application, shock absorbers 2 and 3 are therefore loaded by compression and shock absorbers 4 and 5 are loaded by tension. If it is recognized that vehicle 61 is to be decelerated to a standstill, the first valves of shock absorbers 4 and 5 and the second valves of shock absorbers 2 and 3 are switched shortly before reaching a standstill, so that the damping ratio of the compression stage of shock absorbers 4 and 5 and the damping ratio of the rebound stage of shock absorbers 2 and 3 is increased, when vehicle body 62 pitches to the rear. While vehicle body 62 pitches to the rear, the particular first valve of shock absorbers 2 and 3 and the particular second valve of shock absorbers 4 and 5 are additionally switched, so that the remaining shock absorber stages are stiffened when the vehicle body swings or pitches back to the front again.

Figure 7:
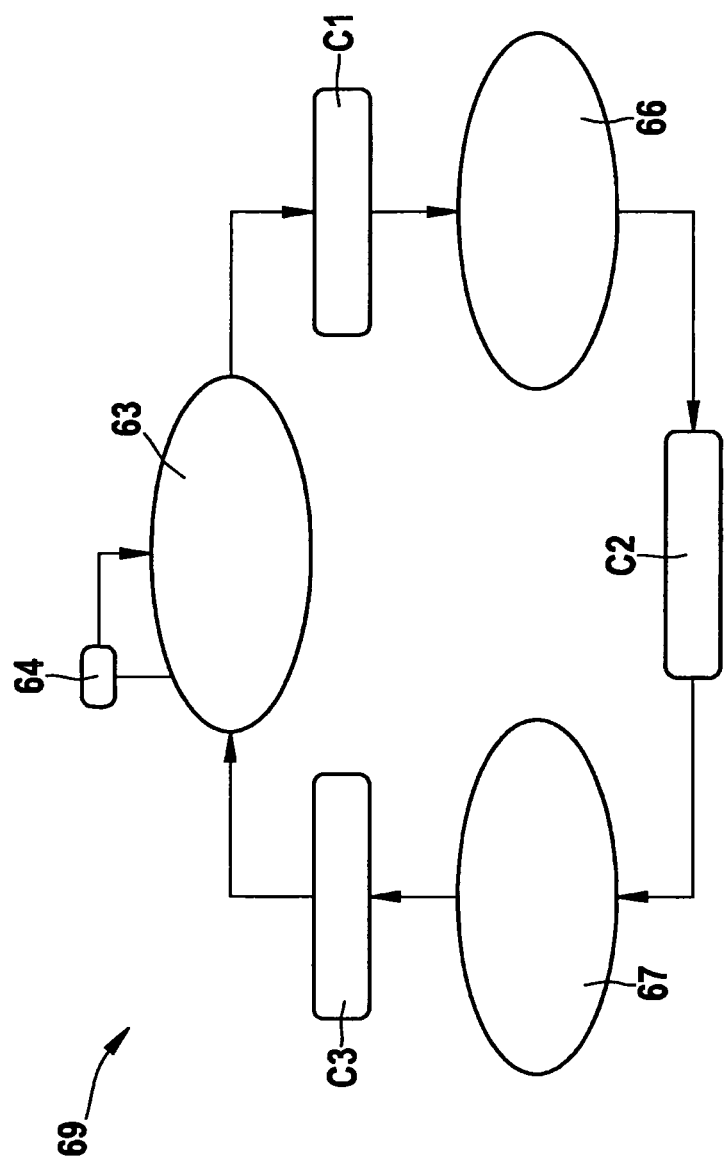
FIG. 7 shows a block diagram of a state machine.

The general strategy may be shown by state machine 69 shown in FIG. 7. The block diagram shown in FIG. 7 schematically shows the performance of the advantageous method for chassis control. In a first step 63, shock absorbers 2 through 5 are in their normal state. As indicated by a box 64, the vehicle state is always checked as to whether a vehicle body movement which results in a compressive and/or tensile load of the shock absorber is to be expected. If braking is recognized, for example, by detecting the brake pedal angle, in a following step C1, the first valve of shock absorbers 4 and 5 on the rear axle and the second valve of shock absorbers 2 and 3 on the front axle are switched to increase the stiffness, as shown in FIG. 6A, so that when the vehicle comes to a standstill and pitches to the rear via axis Y (step 66), the compression stages of shock absorbers 4 and 5 and the rebound stages of shock absorbers 2 and 3 have a higher damping ratio. If a backswing is expected, or if the vehicle has reached a standstill, the second valve of shock absorbers 4 and 5 and the first valve of shock absorbers 2 and 3 are additionally switched in a further step C2 to increase the stiffness, so that when the vehicle pitches back to the front in a step 67, the compression stages of shock absorbers 2 and 3 and the rebound stages of shock absorbers 4 and 5 are also stiffened.

If no further movements or no movements which exceed a determinable threshold value of vehicle body 62 occur within a time span which is determined or determinable (step C3), the first and the second valves of shock absorbers 2 through 5 are switched in such a way that shock absorbers 2 through 5 return back to their normal state (step 63).

The transition conditions of state machine 69 may be defined as follows:

$$C1 \Rightarrow \begin{cases} V_x < P_1 \\ p_{Brake} > P_{Brake} \end{cases}$$

$$C2 \Rightarrow V_x < P_2$$

Figure 8:
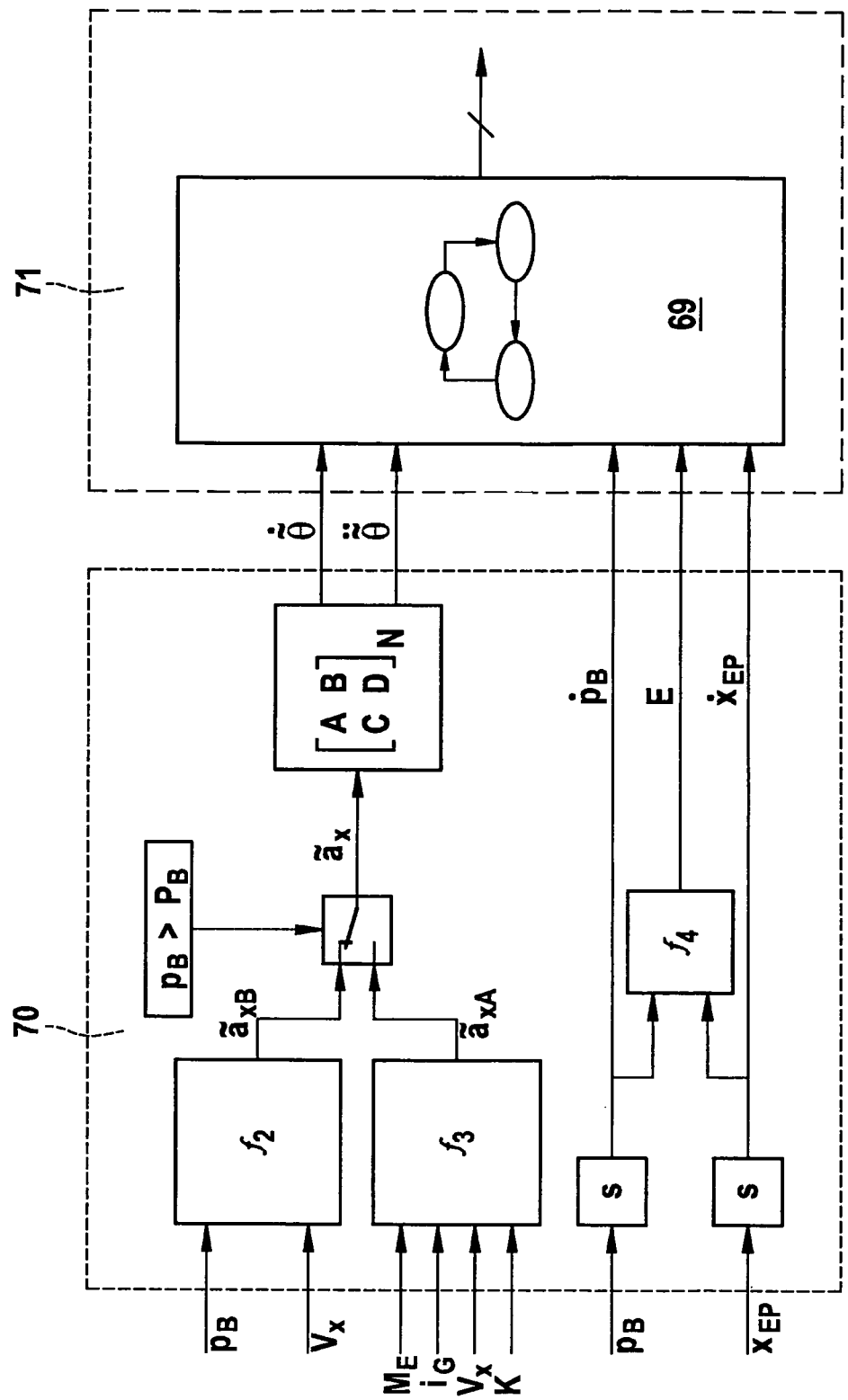
FIG. 8 shows a block diagram to perform the method in the case of a pitch action.

The deceleration to a standstill is therefore recognized when vehicle longitudinal velocity $V_x$ falls below a specific velocity threshold $P_1$ and a specific driver brake pressure $P_{Brake}$ is above a threshold $P_{Brake}$. The standstill is defined using a second velocity threshold $P_2$, $P_2 < P_1$. The transition to the initial shock-absorber state may be triggered in that either the amplitude of the pitch rate calculated from a model falls below the threshold value and/or a certain time has passed, as described above. In FIG. 8, $p_{Brake}$ is shown as $p_B$ and $P_{Brake}$ is shown as $P_B$. The above-described method increases the driving comfort by minimizing the pitch oscillations after deceleration to a standstill.

The shock absorber activation for the pitch damping may therefore be divided into three states:
a) shock absorbers 2 through 5 in the normal state (63),
b) stiff setting of the compression and rebound stages of the shock absorbers of the opposing vehicle axles before the pitch movement in the direction of the compression stage begins (66), and
c) stiff setting of the remaining stages (compression and rebound stages) before the pitching movement changes its direction (67).

FIG. 8 shows a function block diagram for ascertaining and damping the pitching movement of the vehicle body, a block 70 relating to the estimation of the vehicle body movement and a further block 71 relating to the activation of the valves of shock absorbers 2 through 5. The transition from a) to b) is triggered by the gradients of brake pressure $p_{Brake}$, gas pedal position $x_{EnginePedal} = x_{EP}$, or the shift action of the transmission, a dimension being defined for all three actions ($f_4$). The transition from b) to c) is performed after the predicted pitch rate has reached the maximum of the first half-wave. The stiff setting of all shock absorber stages is maintained until the rolling movement has subsided. The criterion for this is the predicted pitch rate, which is ascertained from stationary longitudinal acceleration $\tilde{a}_x$. In the calculation of stationary longitudinal acceleration $\tilde{a}_x$, a differentiation is made between braking case $\tilde{a}_{xBrake} = \tilde{a}_{xB}$ and acceleration case $\tilde{a}_{xAcceleration} = \tilde{a}_{xA}$. In the braking case, the relationship between the brake pressure in the master cylinder and the longitudinal acceleration is approximately linear. This state of affairs is utilized in the pitch function in the form of a linear characteristic curve $f_2$. In addition, state K of a clutch and engaged gear $i_G$ are taken into consideration.

In case of acceleration, the longitudinal acceleration is ascertained using the stationary linear momentum:

$$\tilde{a}_{xAcceleration} = \frac{F_x}{m}.$$

Drive force $F_x$ is calculated from the engine torque minus the air and roadway resistance with simplified assumptions:

$$F_x = \underbrace{\frac{1}{r_{dyn}} \cdot [M_{Engine} - M_{nominal}(1-\eta)] \cdot i_{Gear} \cdot i_{Diff}}_{drive\_force} - \underbrace{f_{roll} \cdot m \cdot g}_{roll\_resistance} - \underbrace{\frac{\rho_{air}}{2} \cdot c_W \cdot A \cdot V_x^2}_{air\_resistance} - \underbrace{\mu \cdot F_z}_{friction\_resistance},$$

where $r_{dyn}$ represents the dynamic tire radius, $M_{Engine}=M_E$ represents the engine drive torque, $i_{Gear}=i_G$ represents the transmission ratio of the transmission, $i_{Diff}$ represents the transmission ratio of a differential gear, $f_{roll} \cdot m \cdot g$ represents the roll resistance, $$\frac{\rho_{air}}{2} \cdot c_W \cdot A \cdot V_x^2$$

represents the air resistance, and $\mu \cdot F_z$ represents the friction resistance. Constants are assumed for all parameters. The distribution of the weight force for the calculation of the roll resistance is ascertained as follows:

$$F_z = \frac{h_{CoG}}{L} \cdot m \cdot \tilde{a}_{xKl} + \frac{L_{RA}}{L} \cdot m \cdot g,$$

where $h_{CoG}$ represents the height of the vehicle center of gravity, L represents the axle distance, $L_{RA}$, $L_{FA}$ represent the distance of the rear axle and the front axle to the vehicle center of gravity, respectively. The longitudinal acceleration required for this purpose may be taken from the last computing cycle (real-time operating system). The predicted pitch rate ($\dot{\theta}$) is calculated from the state model and the longitudinal acceleration as the input as follows:

$$\begin{bmatrix} \ddot{\theta} \\ - \\ \dot{\theta} \end{bmatrix} = A_{HCMY} \cdot \begin{bmatrix} \dot{\theta} \\ - \\ \theta \end{bmatrix} + b_{HCMY} \cdot \tilde{a}_x,$$

the dynamic response and input matrix simulating a half-vehicle model N with respect to vehicle transverse axis Y. The controller may be implemented in the form of the above-described state machine. The state machine reacts to the change in the brake pressure, the gas pedal, or the engaged gear, as well as the predicted pitch rate. The positioning command is calculated separately for each shock absorber 2 through 5 and each stage of particular shock absorber 2 through 5 from the dimension for pitch excitation $f_4$. The dimension for the pitch excitation is calculated as follows:

$$\text{Excitation} = \left[\frac{\dot{p}_{Brake}}{P_{Norm1}}\right]_{-1}^{1} + \left[\frac{\dot{x}_{GasPedal}}{P_{Norm2}}\right]_{-1}^{1} + f(\text{Gear})$$

The individual terms of pseudo-variable "excitation" E are delimited between –1 and 1; it is itself defined as a percentage amount of the pitch excitation. The gradients of vehicle brake pressure $\dot{p}_{Brake}$ and gas pedal deflection $\dot{x}_{GasPedal}$ are normalized, so that the absolute value corresponds to particular maximum excitation 1. In addition, the information about the shift action may be taken into consideration using a discrete function. The positioning command of the state machine describes a proportional increase of the shock-absorber stiffness, 0 indicating a maximally soft setting and 1 indicating a maximally stiff setting of the shock-absorber characteristic. The calculation of the positioning command is performed using a fuzzy characteristic curve, which was derived from the following fundamental rule base:

IF pitch excitation is zero, THEN all compression stages and all rebound stages remain passive;
  IF pitch excitation is positive, THEN compression stages are stiff at the front and rebound stages are stiff at the rear;
  IF pitch excitation is negative, THEN compression stages are stiff at the rear and rebound stages are stiff at the front The transition between a) and b) is performed when the following condition occurs:

$$\begin{cases} \text{Excitation} > P_{Excitation} \\ \quad V_x > P_{V_x} \end{cases}$$

Therefore, the dimension for pitch excitation Excitation or E must exceed a specific threshold $P_{Excitation}$ and a specific longitudinal velocity $P_{V_x}$ must be reached to trigger the transition from a) to b). The transition to c) occurs when the predicted pitch rate begins to drop (relaxation of the pitch oscillation). This is ascertained according to the following formula:

$$\text{Sign}(\dot{\theta}_{Pred}) \neq \text{Sign}(\ddot{\theta}_{Pred}) \text{ at } \Delta t_r$$

The transition into initial state a) occurs when the pitch rate has subsided. For this purpose, the absolute value of the predicted pitch rate is compared to a specific threshold. If the pitch rate is below this threshold for a specific time, all shock absorber stages return to initial state a).

Figure 9:
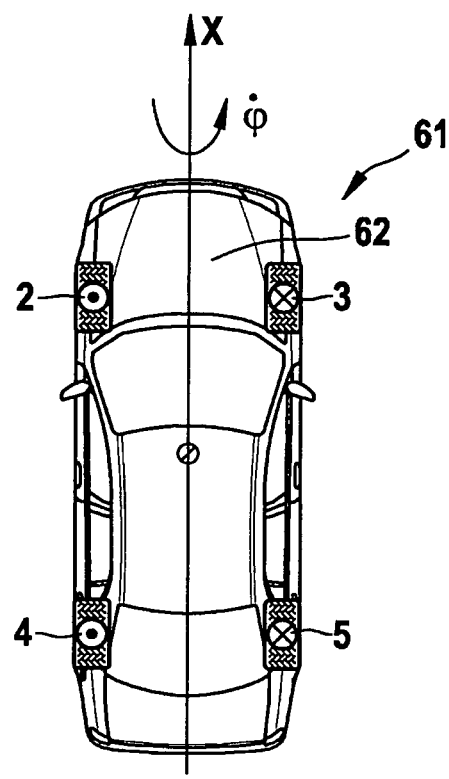
FIG. 9 shows an exemplary embodiment to perform the method in the case of a rolling movement.

The method according to the present invention for chassis control may also be applied for roll damping, as explained in greater detail with reference to FIG. 9. FIG. 9 shows motor vehicle 61 and a longitudinal axis X of motor vehicle 61. As already described above, the shock-absorber activation for the roll damping may also be divided into three states:

d) shock absorbers 2 through 5 in the normal state (no shock absorber activation),
e) stiff setting of the compression and rebound stages of the opposing vehicle side, and
f) stiff setting of the remaining stages, before the rolling movement changes its direction.

The transition into second state e) is triggered by the steering wheel angle gradient as soon as it exceeds a specific threshold. The transition from e) to f) occurs after predicted roll rate φ reaches the minimum of the first half-wave. The stiff setting of all stages is maintained until the rolling oscillation has subsided. The criterion for this is the predicted roll rate, which is ascertained from stationary transverse acceleration $\tilde{a}_y$ with the aid of the half-vehicle model. The stationary transverse acceleration may be ascertained from the stationary vehicle single-track model using $\delta_{FA}$=steering angle on the front axle and $V_{ch}$=characteristic velocity as follows:

$$\tilde{a}_Y = \frac{1}{L} \cdot \frac{V_x^2}{1+\left(\frac{V_x}{V_{ch}}\right)^2} \delta_{FA}$$

Figure 10:
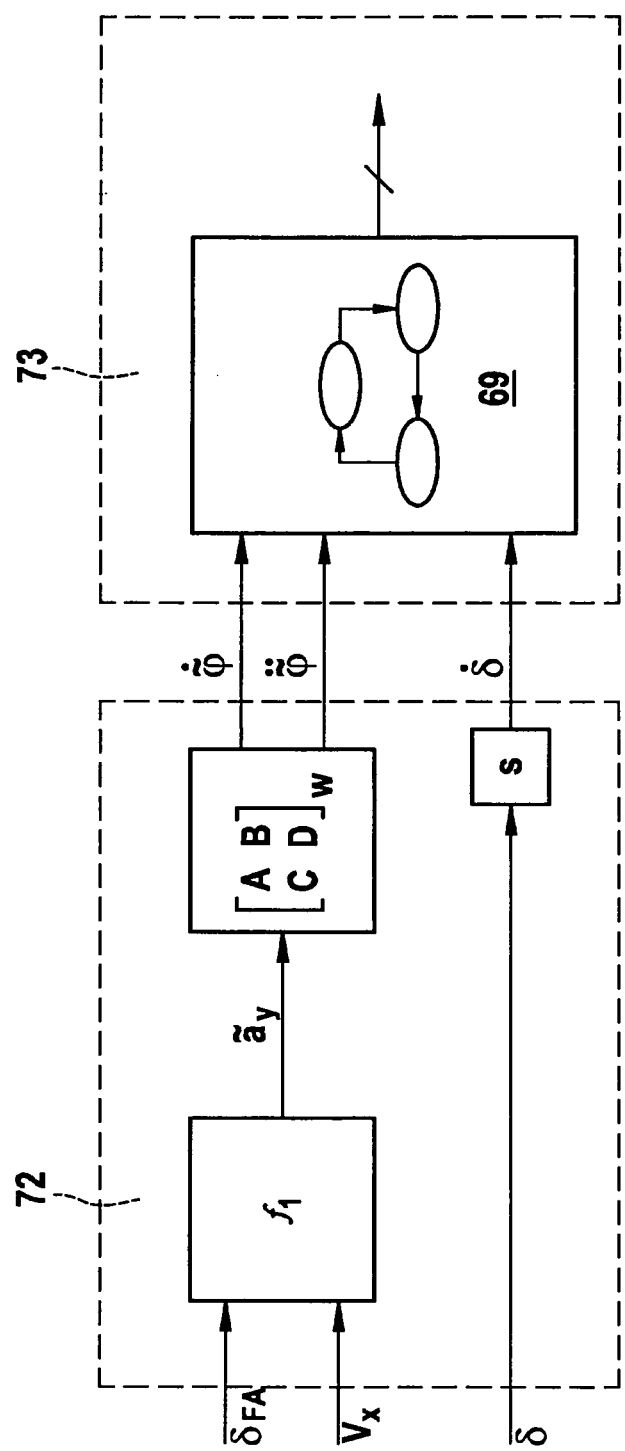
FIG. 10 shows a block diagram to perform the method in the case of a roll action.

The predicted roll rate is calculated from the state model and the transverse acceleration as the input as follows:

$$\begin{bmatrix} \dot{\varphi} \\ \ddot{\varphi} \end{bmatrix} = A_{HCM_X} \cdot \begin{bmatrix} \varphi \\ \dot{\varphi} \end{bmatrix} + b_{HCM_X} \cdot \tilde{a}_y,$$

the dynamic response and input matrix (A and b) simulating a half-vehicle model W with respect to longitudinal axis X. The structure of the entire roll function is shown in FIG. 10, the function being able to be divided into two separate subfunctions: prediction, shown by a block 72 and control, shown by a block 73. The valves of shock absorbers 2 through 5 are activated early using the prediction of the rolling movement, before they are loaded by the forces generated by the rolling movement.

The state machine shown in FIG. 7 reacts to changes of steering wheel angle δ and the predicted roll rate in the case of the application for rolling movements of the vehicle body. The positioning command is calculated separately for each shock absorber 2 through 5 and each stage. The positioning command describes a proportional increase in the shock-absorber stiffness of the particular shock absorber stage, 0 indicating a maximally soft and 1 indicating a maximally stiff setting of the shock-absorber characteristic. The calculation of the positioning command is performed using a fuzzy characteristic curve which may be derived from the following fundamental rule base:
- IF steering wheel angle gradient is zero, THEN all compression stages and all rebound stages remain passive (i.e., all shock absorber stages have standard characteristics);
- IF steering wheel angle gradient is positive, THEN the compression stages are stiff on the left and rebound stages are stiff on the right;
- IF steering wheel angle gradient is negative, THEN the compression stages are stiff on the right and rebound stages are stiff on the left.

As already noted, the state machine for the roll function includes three states d), e), and f), which are performed sequentially. First state d) contains the initialization of the controller. The transition to second state e) occurs when the roll excitation is recognized. This is the case when the following condition is met:

$$\begin{cases} |\delta| > P_\delta \\ V_x > P_{V_x} \end{cases}$$

This means that the steering angle velocity exceeds a specific threshold and a specific vehicle longitudinal velocity must be reached. If one is in second state e), the compression stages are stiffened on the vehicle side opposite to the rolling movement. The rebound stages of the other vehicle side are stiffened simultaneously. The transition from e) to f) occurs when a sign change in the roll rate is recognized. This is recognized using the following condition:

$$\text{Sign}(\dot{\varphi}_{Pred}) \neq \text{Sign}(\ddot{\varphi}_{Pred}) \text{ at } \Delta t_1.$$

Therefore, a falling roll rate is determined with the aid of a sign comparison between the predicted roll rate and its gradient. Both signs must remain different for a specific period of time (avoidance of incorrect identification as a result of signal noise).

Third state f) indicates the complete stiffening of all shock absorber stages, as also during brake application. It is therefore ensured that an arbitrary roll oscillation is maximally damped. The return to standard setting d) of shock absorbers 2 through 5 occurs after the suspected rolling movement has subsided. In order to recognize the state of affairs, a band for the predicted roll rate is defined, which the subsided roll rate should be within. In addition, at low longitudinal velocities, no roll damping is generated, because the difference between the standard setting and the stiffer setting is negligible as a result of the low shock absorber velocities. Therefore, all shock absorber stages return to the standard setting as soon the velocity falls below a specific velocity threshold. The condition for this is defined as follows:

$$\begin{aligned} |\dot{\varphi}_{Pred}| &\leq P_\varphi \\ V_x &< P_{V_x} \end{aligned} \text{ at } \Delta t_2.$$

The above-described functions offer many advantages for the driver with respect to driving comfort and agility. On the one hand, the steering feel and also the lateral guiding are improved by the reduction of the rolling movement, since the intrinsic steering behavior of the vehicle is improved and the oscillations of the wheel vertical force are minimized. Furthermore, the driving comfort is significantly improved due to the reduction of the pitch oscillations and the human sensitivity for vertical accelerations. In addition, the traction and the braking behavior are improved in that the wheel load oscillations are reduced. Additional sensors for the measurement of the movement of the vehicle body, for example, acceleration sensors or spring deflection sensors, are not required, instead already existing signals are used. The two positioning requests from the pitching and rolling movements are advantageously linked for each individual shock absorber in a suitable way, for example, using a MAX operator. Each pathway is divided into the prediction of the particular movement and the calculation of the positioning request to the shock absorber actuators.

What is claimed is:

1. A method for chassis control of a motor vehicle, comprising:
   controlling at least one shock absorber provided between a wheel and a body of the motor vehicle, wherein the shock absorber has a rebound stage with adjustable stiffness and a compression stage with adjustable stiffness, wherein the controlling of the shock absorber includes one of:
   i) increasing the stiffness of only the compression stage for an initial compressive load of the shock absorber generated by a specified first movement of the body of the vehicle, and thereafter, as a function of a first subsequent movement generated by a subsequent tensile load of the shock absorber immediately following the initial compressive load generated by the specified first movement, increasing the stiffness of only the rebound stage; or
   ii) increasing the stiffness of only the rebound stage for an initial tensile load of the shock absorber generated by a specified second movement of the body of the vehicle, and thereafter, as a function of a second subsequent movement generated by a subsequent compressive load of the shock absorber immediately following the initial tensile load generated by the specified second movement, increasing the stiffness of only the compression stage, wherein the shock absorber has at least one first valve for adjusting the stiffness of the compression stage and at least one second valve for adjusting the stiffness of the rebound stage, and wherein the controlling of the shock absorber includes one of:
i) switching the first valve to increase the stiffness of only the compression stage before the initial compressive load of the shock absorber generated by the specified first movement of the body of the vehicle, and switching the second valve during the occurrence of the initial compressive load to increase the stiffness of only the rebound stage for the subsequent tensile load of the shock absorber immediately following the initial compressive load generated by the specified first movement; or
ii) switching the second valve to increase the stiffness of only the rebound stage before the initial tensile load of the shock absorber generated by the specified second movement of the body of the vehicle, and switching the first valve during the occurrence of the initial tensile load to increase the stiffness of only the compression stage for the subsequent compressive load of the shock absorber immediately following the initial tensile load generated by the specified second movement.

2. The method as recited in claim 1, wherein at least one of a global movement of the vehicle body and a local movement of the shock absorber is taken into consideration in the switching of the first valve and the switching of the second valve.

3. The method as recited in claim 2, wherein an expected global movement of the vehicle body is estimated as a function of at least one of steering wheel angle, brake pedal position, gas pedal position, setpoint acceleration, setpoint torque, and an actual state variable of the motor vehicle.

4. The method as recited in claim 3, wherein one of a braking action or an acceleration action which triggers a global movement of the vehicle body is determined as a function of at least one the brake pedal position and the gas pedal position.

5. The method as recited in claim 3, wherein a cornering which triggers a global movement of the vehicle body is estimated as a function of the steering wheel angle.

6. The method as recited in claim 1, wherein each wheel of the vehicle has an associated shock absorber, and wherein, upon initiation of a cornering of the vehicle along a curved path, the first valve of at least one shock absorber on the outside of the curved path and the second valve of at least one shock absorber on the inside of the curved path are switched to increase the stiffness, and, as the cornering is performed, the second valve of the at least one shock absorber on the outside of the curved path and the first valve of the at least one shock absorber on the inside of the curved path are switched to increase the stiffness.

7. The method as recited in claim 6, wherein the first and second valves of the at least one shock absorber on the outside of the curved path and the at least one shock absorber on the inside of the curved path are switched to increase the stiffness only upon exceeding a predetermined threshold value.

8. The method as recited in claim 7, the first and second valves of the at least one shock absorber on the outside of the curved path and the at least one shock absorber on the inside of the curved path are switched to decrease the stiffness if the threshold value is not reached over a predetermined period of time.

9. The method as recited in claim 2, wherein the local movement is determined on the basis of pressure of the shock absorber.

10. The method as recited in claim 2, wherein the local movement is a vertical movement at a fastening point of the shock absorber.

11. The method as recited in claim 2, wherein the local movement is calculated from at least one of a shock-absorber force and a pressure-difference value of the shock absorber, taking into consideration a characteristic curve of the shock absorber.

12. The method as recited in claim 11, wherein the at least one of the shock-absorber force and the pressure-difference value is determined from a pressure in an upper chamber of the shock absorber and a pressure in a lower chamber of the shock absorber.

13. The method as recited in claim 2, wherein the shock absorber is a single-tube shock absorber, and wherein a deflection of the shock absorber is estimated.

14. The method as recited in claim 2, wherein at least one of (i) the local movement of the shock absorber is analyzed for high-frequency components, and (ii) the global movement of the vehicle body is analyzed for low-frequency components.

15. The method as recited in claim 14, wherein a shock absorber stiffness is determined for the compression stage and the rebound stage from the local movement of the shock absorber and the global movement of the vehicle body.

16. The method as recited in claim 15, wherein the shock absorber stiffness determined from the local movement and the shock-absorber stiffness determined from the global movement are combined to form a total shock-absorber stiffness.

17. A method for chassis control of a motor vehicle, comprising:
controlling at least one shock absorber provided between a wheel and a body of the motor vehicle, wherein the shock absorber has a rebound stage with adjustable stiffness and a compression stage with adjustable stiffness, wherein the controlling of the shock absorber includes one of:
i) increasing the stiffness of the compression stage for an initial compressive load of the shock absorber generated by a specified first movement of the body of the vehicle, and thereafter increasing the stiffness of the rebound stage; or
ii) increasing the stiffness of the rebound stage for an initial tensile load of the shock absorber generated by a specified second movement of the body of the vehicle, and thereafter increasing the stiffness of the compression stage,
wherein the shock absorber has at least one first valve for adjusting the stiffness of the compression stage and at least one second valve for adjusting the stiffness of the rebound stage, and wherein the controlling of the shock absorber includes one of:
i) switching the first valve to increase the stiffness of the compression stage before the initial compressive load of the shock absorber generated by the specified first movement of the body of the vehicle, and switching the second valve during the occurrence of the initial compressive load to increase the stiffness of the rebound stage for the subsequent tensile load of the shock absorber immediately following the initial compressive load generated by the specified first movement; or
ii) switching the second valve to increase the stiffness of the rebound stage before the initial tensile load of the shock absorber generated by the specified second movement of the body of the vehicle, and switching the first valve during the occurrence of the initial tensile load to increase the stiffness of the compression stage for the subsequent compressive load of the shock absorber immediately following the initial tensile load generated by the specified second movement, and wherein at least one shock absorber is provided on a front axle of the motor vehicle and at least one other shock absorber is provided on a rear axle of the motor vehicle, and wherein, in the case of a brake application, before the vehicle reaches a standstill, the first valve of the shock absorber on the rear axle and the second valve of the shock absorber on the front axle of the motor vehicle are switched to increase the stiffness, and, upon reaching the standstill, the second valve of the shock absorber on the rear axle and the first valve of the shock absorber on the front axle of the motor vehicle are additionally switched to increase the stiffness.

18. A device for chassis control of a motor vehicle, comprising:

at least one shock absorber provided between a wheel and a body of the motor vehicle, wherein the shock absorber has a rebound stage with adjustable stiffness and a compression stage with adjustable stiffness, and wherein the shock absorber is adapted to be controlled by one of:

i) increasing the stiffness of only the compression stage for an initial compressive load of the shock absorber generated by a specified first movement of the body of the vehicle, and thereafter, as a function of a first subsequent movement generated by a subsequent tensile load of the shock absorber immediately following the initial compressive load generated by the specified first movement, increasing the stiffness of only the rebound stage; or ii) increasing the stiffness of only the rebound stage for an initial tensile load of the shock absorber generated by a specified second movement of the body of the vehicle, and thereafter, as a function of a second subsequent movement generated by a subsequent compressive load of the shock absorber immediately following the initial tensile load generated by the specified second movement, increasing the stiffness of only the compression stage, wherein the shock absorber has at least one first valve for adjusting the stiffness of the compression stage and at least one second valve for adjusting the stiffness of the rebound stage, and wherein the shock absorber is adapted to be controlled by one of:

i) switching the first valve to increase the stiffness of only the compression stage before the initial compressive load of the shock absorber generated by the specified first movement of the body of the vehicle, and switching the second valve during the occurrence of the initial compressive load to increase the stiffness of only the rebound stage for the subsequent tensile load of the shock absorber immediately following the initial compressive load generated by the specified first movement; or ii) switching the second valve to increase the stiffness of only the rebound stage before the initial tensile load of the shock absorber generated by the specified second movement of the body of the vehicle, and switching the first valve during the occurrence of the initial tensile load to increase the stiffness of only the compression stage for the subsequent compressive load of the shock absorber immediately following the initial tensile load generated by the specified second movement.

19. The device as recited in claim 18, wherein at least one of: (i) the shock absorber has at least one of an analysis unit and a pressure measuring unit; and (ii) an output stage of at least one valve of the shock absorber is adapted to be set with the aid of the analysis unit.

20. The device as recited in claim 19, wherein the analysis unit is connected by a data bus to a control unit which estimates a global movement of the body of the vehicle.

\* \* \* \* \*